US009157139B2

(12) United States Patent
Rajagopalan

(10) Patent No.: US 9,157,139 B2
(45) Date of Patent: Oct. 13, 2015

(54) PROCESS FOR APPLYING A SHAPE MEMORY ALLOY EROSION RESISTANT PROTECTIVE STRUCTURE ONTO AN AIRFOIL OF A TURBINE BLADE

(75) Inventor: Sudhir Rajagopalan, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 2123 days.

(21) Appl. No.: 12/188,611

(22) Filed: Aug. 8, 2008

(65) Prior Publication Data

US 2010/0034661 A1  Feb. 11, 2010

(51) Int. Cl.
| C22F 1/00 | (2006.01) |
| B23P 11/00 | (2006.01) |
| B32B 15/01 | (2006.01) |
| F01D 5/28 | (2006.01) |
| F01D 5/14 | (2006.01) |

(52) U.S. Cl.
CPC .............. *C22F 1/006* (2013.01); *B32B 15/01* (2013.01); *F01D 5/147* (2013.01); *F01D 5/286* (2013.01); *F05D 2240/121* (2013.01); *F05D 2240/303* (2013.01); *F05D 2300/505* (2013.01); *Y10T 428/12493* (2015.01); *Y10T 428/12806* (2015.01); *Y10T 428/12861* (2015.01); *Y10T 428/12951* (2015.01)

(58) Field of Classification Search
CPC ..................................................... F01D 5/288
USPC ....... 416/241 R; 148/527; 428/615, 660, 668; 285/381.2
See application file for complete search history.

(56) References Cited

U.S. PATENT DOCUMENTS

| 3,913,444 | A | * | 10/1975 | Otte .............................. 411/479 |
| 4,035,007 | A | | 7/1977 | Harrison et al. |
| 4,283,079 | A | * | 8/1981 | Flaherty ...................... 285/381.2 |
| 6,127,044 | A | * | 10/2000 | Yamamoto et al. ........... 428/603 |
| 6,213,711 | B1 | | 4/2001 | Mueller et al. |
| 7,261,518 | B2 | | 8/2007 | Golinkin et al. |
| 7,300,708 | B2 | | 11/2007 | Gigliotti, Jr. et al. |
| 7,805,839 | B2 | * | 10/2010 | Cammer ...................... 29/889.7 |
| 2005/0278950 | A1 | * | 12/2005 | Despreaux et al. ........ 29/889.71 |
| 2008/0145228 | A1 | | 6/2008 | Truckenmueller et al. |

FOREIGN PATENT DOCUMENTS

WO    2008030324 A2    3/2008

* cited by examiner

*Primary Examiner* — Anh Mai

(57) ABSTRACT

A component is provided for use in a turbine comprising: a substrate formed from an alloy, and an erosion resistant protective structure mechanically coupled to a portion of the substrate for protecting the substrate portion from erosion caused by a fluid. The erosion resistant protective structure may be formed from a shape memory alloy.

12 Claims, 2 Drawing Sheets

PROCESS FOR APPLYING A SHAPE MEMORY ALLOY EROSION RESISTANT PROTECTIVE STRUCTURE ONTO AN AIRFOIL OF A TURBINE BLADE

FIELD OF THE INVENTION

The present invention is related to an erosion resistant protective structure for protecting a portion of a substrate from erosion, and a process for applying the structure to the substrate portion.

BACKGROUND OF THE INVENTION

U.S. Pat. No. 7,300,708, the entire disclosure of which is incorporated by reference herein, discloses affixing a shape memory alloy structure to a turbine component. The '708 patent teaches that the shape memory alloy can be affixed to the turbine component by processes such as "brazing, extrusion, explosion bonding, hot-isotactic-pressing (HIP), cladding, laser processes, plasma transfer arc processes, ion plasma deposition, forging, fusion welding, vacuum plasma spraying, thermally spraying, friction-stir welding," see column 7, lines 56-60. The '708 patent further teaches that the shape memory alloy can be formed as an insert and/or a coupon, which can then be attached to the turbine component, see column 7, lines 60-63. It is believed that all of the described processes in the '708 patent involve substantial addition of energy in the form of heat to the shape memory alloy structure or the shape memory alloy structure and the turbine component. The resulting temperatures can be substantially above ambient temperature. This may necessitate additional processing steps to correct possible adverse effects of the high temperature on the properties of the shape memory alloy structure and/or the turbine component.

SUMMARY OF THE INVENTION

In accordance with a first aspect of the present invention, a component is provided for use in a turbine comprising: a substrate formed from an alloy, and an erosion resistant protective structure mechanically coupled to a portion of the substrate for protecting the substrate portion from erosion caused by a fluid. The erosion resistant protective structure may be formed from a shape memory alloy.

Preferably, the erosion resistant protective structure is mechanically coupled to the substrate portion without adding an amount of heat required to effect mixing of the protective structure shape memory alloy with the substrate alloy at an interface where the protective structure engages the substrate. Further, the erosion resistant protective structure is preferably mechanically coupled to the substrate portion without adding an amount of heat required to effect the melting of the protective structure shape memory alloy so as to form, for example, a coating.

The substrate alloy may comprise one of a nickel based alloy, a cobalt based alloy, a titanium based alloy and a ferrous alloy.

Preferably, the shape memory alloy comprises an alloy exhibiting a martensite phase when cooled to a temperature equal to or less than a martensite finish temperature, and an austenite phase when heated to an austenite finish temperature less than ambient temperature. Further, it is preferred that the shape memory alloy comprises an alloy exhibiting a superelastic phase when at a temperature corresponding to an operating temperature to which the component is exposed when used within the turbine.

The component may comprise a blade having an airfoil defining the component portion.

In accordance with a second aspect of the present invention, a process is provided for combining an erosion resistant protective structure with a substrate to form a component for use in a turbine comprising: providing a substrate formed from an alloy; providing an erosion resistant protective structure formed from a shape memory alloy exhibiting a martensite phase when cooled to a temperature equal to or less than a martensite finish temperature, wherein the martensite finish temperature is preferably below a predefined temperature, and an austenite phase when heated to an austenite finish temperature less than the predefined temperature; cooling the protective structure shape memory alloy such that the shape memory alloy changes to a martensite phase; applying the protective structure to a portion of the substrate while the shape memory alloy is in the martensite phase; and heating the protective structure shape memory alloy such that the protective structure shape memory alloy changes from the martensite phase to the austenite phase and becomes mechanically coupled to the substrate.

The process may further comprise expanding the protective structure shape memory alloy when in the martensite phase from an original shape to an expanded shape prior to the applying step.

In one embodiment, the protective structure mechanically engages the substrate as the protective structure shape memory alloy attempts to return to its original shape when changing to the austenite phase.

The predefined temperature may comprise ambient temperature, such as a temperature falling within a range of between about −40 to about 80 degrees F.

In accordance with a third aspect of the present invention, a process is provided for combining an erosion resistant protective structure with a substrate to form a component for use in a turbine comprising: providing a substrate formed from an alloy; providing an erosion resistant protective structure formed from a shape memory alloy capable of changing between a martensite phase and an austenite phase; applying the protective structure to a portion of the substrate while the shape memory alloy is in the martensite phase; and causing the protective structure shape memory alloy to change from the martensite phase to the austenite phase so as to become mechanically coupled to the substrate.

The process may further comprise cooling the protective structure shape memory alloy to a martensite finish temperature below a predefined temperature such that the shape memory alloy changes to a martensite phase.

The causing step may comprise heating the protective structure shape memory alloy to an austenite finish temperature less than the predefined temperature such that the protective structure shape memory alloy changes from the martensite phase to the austenite phase and becomes mechanically coupled to the substrate.

DETAILED DESCRIPTION OF THE INVENTION

In accordance with a first aspect of the present invention, a component 10 is provided for use in a turbine (not shown), such as a low pressure steam turbine. In the illustrated embodiment, the component 10 (not shown in FIGS. 3-4) comprises a blade 12. The blade 12 may be combined with a plurality of similar blades, which together are coupled to a rotatable shaft, so as to define a row of blades. A plurality of rows of blades, e.g., four, may be coupled to the rotatable shaft so as to define a rotor (not shown) within an outer casing (not shown) of the steam turbine. It is contemplated that the blade 12 may be used as a blade in a last row of blades within the low pressure steam turbine. As steam flows through the steam turbine, the steam impinges upon the blades causing the rotor, including the shaft, to rotate. The entire disclosure of U.S. Patent Publication US 2008/0145228 A1, which discusses a low pressure steam turbine, is incorporated by reference herein.

While the present invention is described as comprising a blade 12 forming part of a last row of blades within a low pressure steam turbine, it is contemplated that a component of the present invention may comprise other elements/components in a gas or steam turbine.

Figure 1:
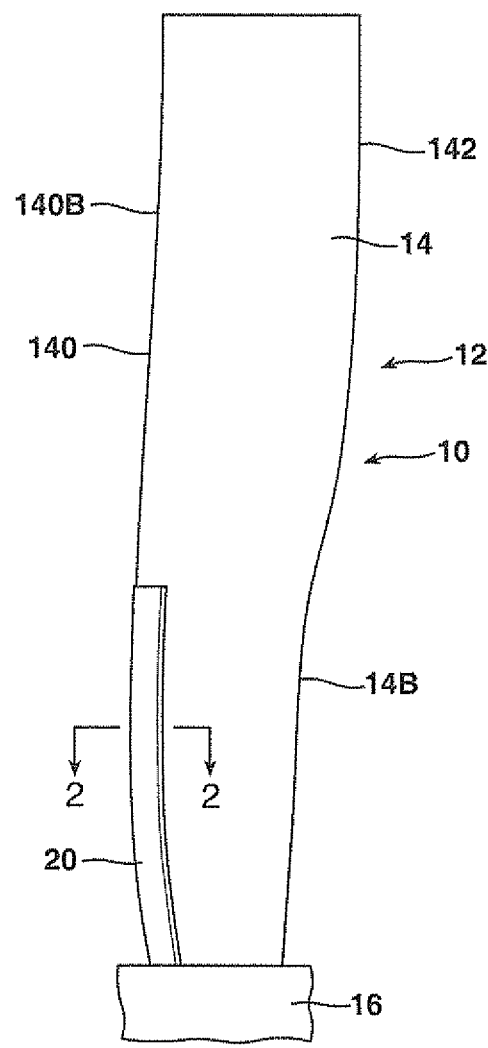
FIG. 1 is a side view of a component of a turbine provided with an erosion resistant protective structure in accordance with the present invention.

The blade 12, also referred to herein as a substrate, comprises an airfoil 14, also referred to herein as a substrate portion, and a root portion 16, see FIG. 1. The root portion 16 is coupled to the shaft. The blade 12 may be formed from an alloy such as a nickel based alloy, a cobalt based alloy, a titanium based alloy or a ferrous alloy.

Trailing edge portions of prior art airfoils forming parts of blades comprising a last row of blades within a low pressure steam turbine are susceptible to damage or erosion by fluid or water droplets impinging upon the trailing edge portions. Such airfoil erosion can significantly reduce the life of such prior art blades.

Figure 2:
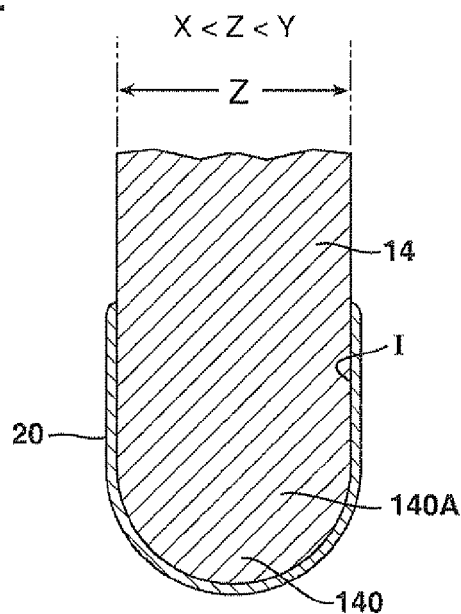
FIG. 2 is a view taken along view line 2-2 in FIG. 1.

In accordance with the present invention, an erosion resistant protective structure 20 is mechanically coupled to a lower portion 140A of a trailing edge 140 of the airfoil 14 for protecting the trailing edge lower portion 140A from erosion caused by fluid droplets striking the lower portion 140A, see FIGS. 1 and 2. While not shown in the drawings, it is contemplated that a similar erosion resistant protective structure may be provided on an upper or remaining portion 140B of the airfoil trailing edge 140 or along any portion of a leading edge 142 of the airfoil 14.

The erosion resistant protective structure 20 is formed from a shape memory alloy. In the illustrated embodiment, the shape memory alloy comprises an alloy exhibiting a martensite phase when cooled to a temperature equal to or less than a martensite finish temperature $M_f$ and exhibiting an austenite phase when heated to a temperature equal to or greater than an austenite finish temperature $A_f$. The shape memory alloy begins its transformation from austenite to martensite at a martensite start temperature $M_s$, which temperature is greater than the martensite finish temperature $M_f$. Further, the shape memory alloy begins its transformation from martensite to austenite at the austenite start temperature $A_s$, which temperature is less than the austenite finish temperature $A_f$. The shape memory alloy is less stiff in the martensite phase than in the austenite phase. Preferably, the austenite finish temperature $A_f$ is less than a predefined temperature. Since the martensite start and finish temperatures $M_s$ and $M_f$ are less than the austenite start and finish temperatures $A_s$ and $A_f$, the martensite start and finish temperatures $M_s$ and $M_f$ are also less than the predefined temperature. In the illustrated embodiment, the predefined temperature comprises ambient temperature, such as a temperature falling within a range of between about −40 and about 80 degrees F. In any event, it is also preferred that the austenite finish temperature $A_f$ be less than about 150 degrees F.

The shape memory alloy preferably further exhibits a superelastic phase at a temperature corresponding to an internal operating temperature within the steam turbine, e.g., about 1000 degrees F., to which the blade 12 is exposed when used within the steam turbine. In the illustrated embodiment, the shape memory alloy may be in the superelastic phase once it is transformed into the austenite phase. Because the protective structure 20 is formed from a shape memory alloy having a superelastic phase at the internal operating temperature within the steam turbine, when the protective structure 20 is impacted by a water droplet during operation of the steam turbine, the stress of the impact transforms the shape memory alloy at and near the point of impact from its austenite phase to its martensite phase, where the resulting martensite is referred to as stress-induced martensite. On removal of the stress, the stress-induced martensite spontaneously reverts back to the austenite phase, presuming no more than a given or predefined amount of strain, e.g., about 8% strain, occurred in the shape memory alloy due to impact of the water droplet. If the impact of the water droplet resulted in a strain less than about the given or predefined strain amount, the shape memory alloy returns to its original shape without being plastically deformed. Further, as the shape memory alloy changes phases from austenite, to martensite and back to austenite, it functions to dampen away much of the force resulting from the water droplet striking the protective structure 20 and, hence, prevents erosion of the protective structure 20 and the airfoil trailing edge lower portion 140A.

Example shape memory alloys which are believed to be capable of being used in farming the erosion resistant protective structure 20 include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, ruthenium-niobium based alloys, ruthenium-tantalum based alloys, titanium based alloys, and the like.

Figure 3:
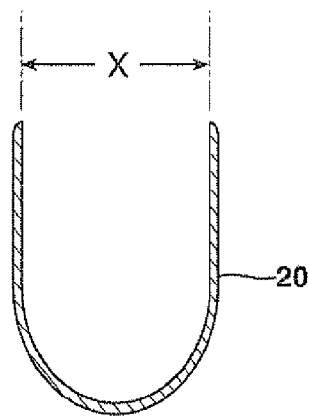
FIG. 3 is a cross sectional view of the erosion resistant protective structure in its original shape (in its austenite phase) and prior to it being applied to the turbine component.
Figure 4:
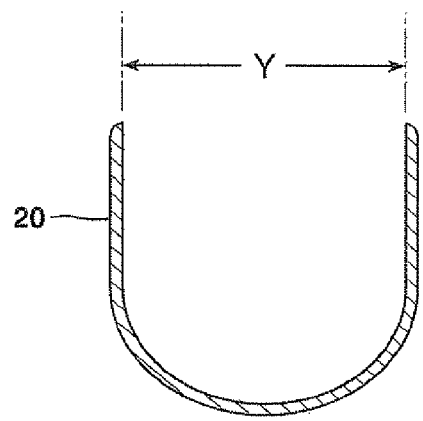
FIG. 4 is a cross sectional view of the erosion resistant protective structure when in a martensite phase and expanded from its original shape prior to being applied to the turbine component.

The erosion resistant protective structure 20 is formed having an original or initial U-shape when in the austenite phase, see FIG. 3. The protective structure 20, when in its original shape and the austenite phase, has a maximum width X, see FIG. 3. As is apparent from FIG. 2, the airfoil trailing edge 140 is also formed having a U-shape. However, the U-shaped airfoil trailing edge 140 has a maximum width Z, which is greater in dimension than the maximum width X of the protective structure 20 as originally shaped.

The protective structure may be mechanically coupled to the airfoil trailing edge 140 as follows. Initially, the erosion resistant structure 20 is cooled to its martensite phase, i.e., cooled to a temperature equal to or less than the martensite finish temperature $M_f$, then expanded from its original maximum width X so as to have a maximum width Y, see FIG. 4. Thereafter, the expanded erosion resistant protective structure 20 is applied or placed onto to airfoil trailing edge lower portion 140A. Next, the erosion resistant protective structure 20 is heated to a temperature equal to or greater than the austenite finish temperature $A_f$, so as to return it to its austenite phase. As the shape memory alloy protective structure 20 returns to its austenite phase, it attempts to move to or recover its original shape shown in FIG. 3. However, because the maximum width Z of the airfoil trailing edge 140 is greater than the maximum width X of the protective structure 20, when in its original shape and in the austenite phase, the protective structure 20, as it recovers to its original shape, frictionally grips or clamps onto the airfoil trailing edge lower portion 140A so as to become mechanically coupled to the airfoil trailing edge lower portion 140A.

Preferably, the erosion resistant protective structure 20 is mechanically coupled to the airfoil trailing edge lower portion 140A without adding an amount of heat energy required to effect mixing of the protective structure shape memory alloy with the airfoil alloy at an interface I where the protective structure 20 engages the airfoil 14. Further, the erosion resistant protective structure 20 is mechanically coupled to the airfoil trailing edge lower portion 140A without adding an amount of heat energy required to effect the melting of the protective structure shape memory alloy. By mechanically coupling the protective structure 20 to the airfoil trailing edge lower portion 140A, only a very small amount of energy in the form of heat is required to raise the temperature of the protective structure 20 to the austenite finish temperature $A_f$, which, as noted above, is preferably less than about 150 degrees F. Hence, no substantial alteration of the final internal structure of the protective structure 20 is believed to occur during the mechanical coupling process of the protective structure 20 to the airfoil trailing edge lower portion 140A. In contrast, when heat energy is provided to effect the mixing of a protective structure shape memory alloy with an airfoil alloy or to effect the melting of a protective structure shape memory alloy so as to form, for example, a coating to be applied to an airfoil, it is believed that substantial alteration of the final internal structure of the erosion resistance protective structure will occur requiring a further process to offset or correct the final internal structure alteration.

A process for applying the erosion resistant protective structure 20 to an airfoil trailing edge lower portion 140A may comprise the following steps. First, the erosion resistant protective structure 20 is cooled to a temperature equal to or less than the martensite finish temperature $M_f$, which temperature is below the predefined temperature, such that the shape memory alloy protective structure 20 changes from its austenite phase to its martensite phase. Thereafter, the protective structure 20 is expanded to a maximum width Y, see FIG. 4. While the protective structure 20 is still in its martensite phase and expanded, it is fitted onto the airfoil trailing edge lower portion 140A. Thereafter, the protective structure 20 is heated to a temperature equal to or greater than the austenite finish temperature $A_f$, which temperature is less than the predefined temperature, so as to allow the protective structure 20 to return to its austenite phase. As the protective structure 20 changes from the martensite phase to the austenite phase, it frictional grips the airfoil trailing edge lower portion 140A and, as result, becomes mechanically coupled to the trailing edge lower portion 140A. As noted above, the predefined temperature equals ambient temperature in the illustrated embodiment. Also as noted above, the austenite finish temperature $A_f$ is preferably less than about 150 degrees F.

While a particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for combining an erosion resistant protective structure with a substrate to form a component comprising a blade having an airfoil for use in a turbine comprising:
   providing a substrate formed from an alloy, the substrate comprising the blade having the airfoil;
   providing an erosion resistant protective structure formed from a shape memory alloy exhibiting a martensite phase when cooled to a temperature equal to or less than a martensite finish temperature, and an austenite phase when heated to an austenite finish temperature less than a predefined temperature;
   cooling the protective structure shape memory alloy such that the shape memory alloy changes to a martensite phase;
   applying the protective structure to a portion of the airfoil while the shape memory alloy is in the martensite phase;
   heating the protective structure shape memory alloy such that the protective structure shape memory alloy changes from the martensite phase to the austenite phase and becomes mechanically coupled to the airfoil; and
   wherein the protective structure shape memory alloy defines a portion of the component that is exposed to a fluid passing through the turbine, and wherein the protective structure shape memory alloy covers the portion of the airfoil for protecting the portion of the airfoil from erosion caused by contact with fluid droplets.

2. The process as set out in claim 1, further comprising expanding the protective structure shape memory alloy when in the martensite phase from an original shape to an expanded shape prior to said applying.

3. The process as set out in claim 2, wherein said protective structure frictionally engages the substrate as the protective structure shape memory alloy attempts to return to its original shape when changing to the austenite phase.

4. The process as set out in claim 3, wherein applying the protective structure to a portion of the airfoil comprises applying the protective structure to one of a trailing edge and a leading edge of the airfoil.

5. The process as set out in claim 4, wherein heating the protective structure shape memory alloy comprises heating the protective structure shape memory alloy such that the protective structure shape memory alloy changes from the martensite phase to the austenite phase and frictionally engages opposed surfaces of the airfoil adjacent to the one of the leading edge and the trailing edge to mechanically couple the protective structure shape memory alloy to the one of the leading edge and the trailing edge of the airfoil.

6. The process as set out in claim 1, wherein said shape memory alloy comprises an alloy exhibiting a superelastic phase at a temperature corresponding to an operating temperature to which the component is exposed when used within the turbine.

7. The process as set out in claim 1, wherein the predefined temperature comprises ambient temperature.

8. A process for combining an erosion resistant protective structure with a substrate to form a component comprising a blade having an airfoil for use in a turbine comprising:
   providing a substrate formed from an alloy, the substrate comprising the blade having the airfoil, the airfoil comprising a leading edge and a trailing edge opposed from the leading edge;

providing an erosion resistant protective structure formed from a shape memory alloy capable of changing between a martensite phase and an austenite phase;

applying the protective structure to a portion of one of the leading edge and the trailing edge of the airfoil while the shape memory alloy is in the martensite phase; and causing said protective structure shape memory alloy to change from the martensite phase to the austenite phase so as to become mechanically coupled to the one of the leading edge and the trailing edge of the airfoil; and wherein the protective structure shape memory alloy defines a portion of the component that is exposed to a fluid passing through the turbine, and wherein the protective structure shape memory alloy covers the portion of the one of the leading edge and the trailing edge of the airfoil for protecting the portion of the one of the leading edge and the trailing edge of the airfoil from erosion caused by contact with fluid droplets.

9. The process as set out in claim 8, further comprising cooling the protective structure shape memory alloy to a martensite finish temperature below a predefined temperature such that the shape memory alloy changes to a martensite phase.

10. The process as set out in claim 9, wherein said causing step comprises heating the protective structure shape memory alloy to an austenite finish temperature less than the predefined temperature such that the protective structure shape memory alloy changes from the martensite phase to the austenite phase and becomes mechanically coupled to the one of the leading edge and the trailing edge of the airfoil.

11. The process as set out in claim 10, wherein the predefined temperature comprises ambient temperature.

12. The process as set out in claim 10, wherein said protective structure frictionally engages opposed surfaces of the airfoil adjacent to the one of the leading edge and the trailing edge to mechanically couple the protective structure shape memory alloy to the one of the leading edge and the trailing edge of the airfoil as the protective structure shape memory alloy changes to the austenite phase.

* * * * *